(12) United States Patent
Adar et al.

(10) Patent No.: US 10,169,247 B2
(45) Date of Patent: *Jan. 1, 2019

(54) DIRECT MEMORY ACCESS BETWEEN AN ACCELERATOR AND A PROCESSOR USING A COHERENCY ADAPTER

(71) Applicant: International Business Machines Corporation, Armonk, NY (US)

(72) Inventors: Etai Adar, Yokneam Illit (IL); Lakshminarayana B. Arimilli, Austin, TX (US); Yiftach Benjamini, Givat Ela (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,448

(22) Filed: Nov. 8, 2017

(65) Prior Publication Data

US 2018/0089104 A1 Mar. 29, 2018

Related U.S. Application Data (63) Continuation of application No. 15/467,120, filed on Mar. 23, 2017, now Pat. No. 9,892,061, which is a
(Continued)

(51) Int. Cl.
*G06F 13/28* (2006.01)
*G06F 13/42* (2006.01)
(Continued)

(52) U.S. Cl.
CPC .......... *G06F 12/1081* (2013.01); *G06F 13/28* (2013.01); *G06F 13/4068* (2013.01); *G06F 13/4282* (2013.01); *G06F 2212/1016* (2013.01)

(58) Field of Classification Search
CPC ..... G06F 13/28; G06F 13/482; G06F 12/1081
See application file for complete search history.

(56) References Cited

U.S. PATENT DOCUMENTS

| | | |
|---|---|---|
| 5,535,351 A | 7/1996 | Peng |
| 8,738,860 B1 | 5/2014 | Griffin et al. |

(Continued)

OTHER PUBLICATIONS

Wile, "Coherent Accelerator Processor Proxy (CAPI) on POWER8", Enterprise 2014, http://www.nallatech.com/wp-content/uploads/Ent2014-CAPI-on-Power8.pdf (online), IBM Corporation, dated 2014 (month unknown), 21 pages.

(Continued)

*Primary Examiner* — Glenn A. Auve
(74) *Attorney, Agent, or Firm* — Joseph D. Downing; Grant A. Johnson; Kennedy Lenart Spraggins LLP (57) ABSTRACT

Direct memory access between an accelerator and a processor using a coherency adapter including receiving, by the adapter from the accelerator, a request to initiate a DMA transfer; providing, by the adapter, a translation tag ('XTAG') to the accelerator; receiving, by the adapter from the accelerator, a DMA instruction comprising the XTAG; generating, by the adapter, a DMA instruction comprising a real address based on the XTAG; and sending, by the adapter, the generated DMA instruction comprising the real address to a communications bus.

20 Claims, 6 Drawing Sheets

Related U.S. Application Data continuation of application No. 15/275,865, filed on Sep. 26, 2016, now Pat. No. 9,715,470.

(51) Int. Cl.
*G06F 12/1081* (2016.01)
*G06F 13/40* (2006.01)

(56) References Cited

U.S. PATENT DOCUMENTS

| | | |
|---|---|---|
| 9,715,470 B1 | 7/2017 | Adar et al. |
| 9,892,061 B1 * | 2/2018 | Adar ............... G06F 13/28 |
| 2007/0226424 A1 | 9/2007 | Clark et al. |
| 2009/0216957 A1 | 8/2009 | Chaussade et al. |
| 2011/0145447 A1 | 6/2011 | Dimond |
| 2014/0101403 A1 | 4/2014 | Martin |
| 2016/0217101 A1 | 7/2016 | Johns et al. |

OTHER PUBLICATIONS

IBM, "POWER8 Coherent Accelerator Processor Interface (CAPI)", IBM Corporation, http://www-304.ibm.com/support/customercare/sas/f/capi/home.html (online), printed May 24, 2016, 2 pages.

Appendix P; List of IBM Patent or Applications Treated as Related, Nov. 8, 2017, 2 pages.

Adar et al., *Direct Memory Access Between an Accelerator and a Processor Using a Coherency Adapter*, IBM, U.S. Appl. No. 15/467,120, filed Mar. 23, 2017, 25 pages.

* cited by examiner

DIRECT MEMORY ACCESS BETWEEN AN ACCELERATOR AND A PROCESSOR USING A COHERENCY ADAPTER

CROSS-REFERENCE TO RELATED APPLICATION

This application is a continuation application of and claims priority from U.S. patent application Ser. No. 15/467,120, filed Mar. 23, 2017, which claims priority to U.S. Pat. No. 9,715,470, issued Jul. 25, 2017.

BACKGROUND

Field of the Invention

The field of the invention is data processing, or, more specifically, methods, apparatus, and products for direct memory access between an accelerator and a processor using a coherency adapter.

Description Of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for direct memory access between an accelerator and a processor using a coherency adapter are disclosed in this specification. Direct memory access between an accelerator and a processor using a coherency adapter includes receiving, by the adapter from the accelerator, a request to initiate a DMA transfer; providing, by the adapter, a translation tag ('XTAG') to the accelerator; receiving, by the adapter from the accelerator, a DMA instruction comprising the XTAG; generating, by the adapter, a DMA instruction comprising a real address based on the XTAG; and sending, by the adapter, the generated DMA instruction comprising the real address to a communications bus.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
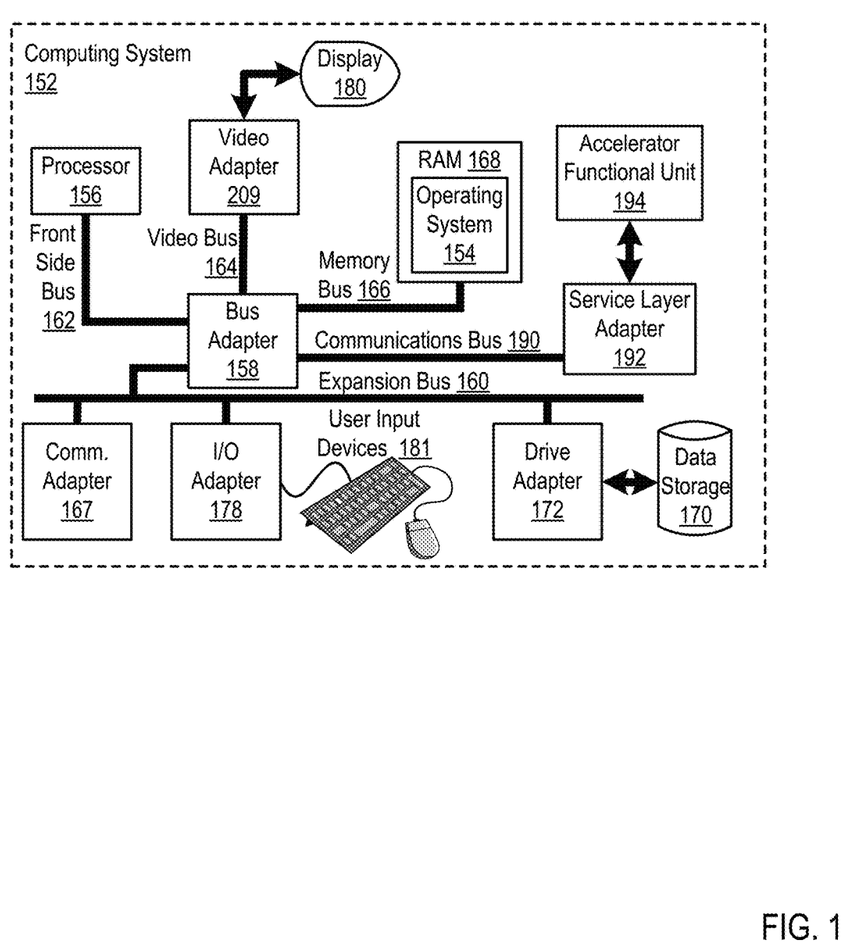
FIG. 1 sets forth a block diagram of an example system configured for direct memory access between an accelerator and a processor using a coherency adapter according to embodiments of the present invention.

Exemplary methods, apparatus, and products for direct memory access between an accelerator and a processor using a coherency adapter in accordance with the present invention are described with reference to the accompanying drawings, beginning with FIG. 1. FIG. 1 sets forth a block diagram of automated computing machinery comprising an exemplary computing system (152) configured for direct memory access between an accelerator and a processor using a coherency adapter according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for direct memory access between an accelerator and a processor using a coherency adapter according to embodiments of the present invention include UNIX™, Linux™ Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170). Also stored in RAM (168) and part of the operating system is the memory firmware (126), a module of computer program instructions for direct memory access between an accelerator and a processor using a coherency adapter.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for direct memory access between an accelerator and a processor using a coherency adapter according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for direct memory access between an accelerator and a processor using a coherency adapter according to embodiments of the present invention include modems for wired dial-up communications, Ethernet (IEEE 802.3) adapters for wired data communications, and 802.11 adapters for wireless data communications.

The exemplary computing system (152) of FIG. 1 includes a communications bus (190) that connects the processor and RAM (168) (via the bus adapter (158)) to the service layer adapter (192) and the accelerator functional unit (194).

Figure 2:
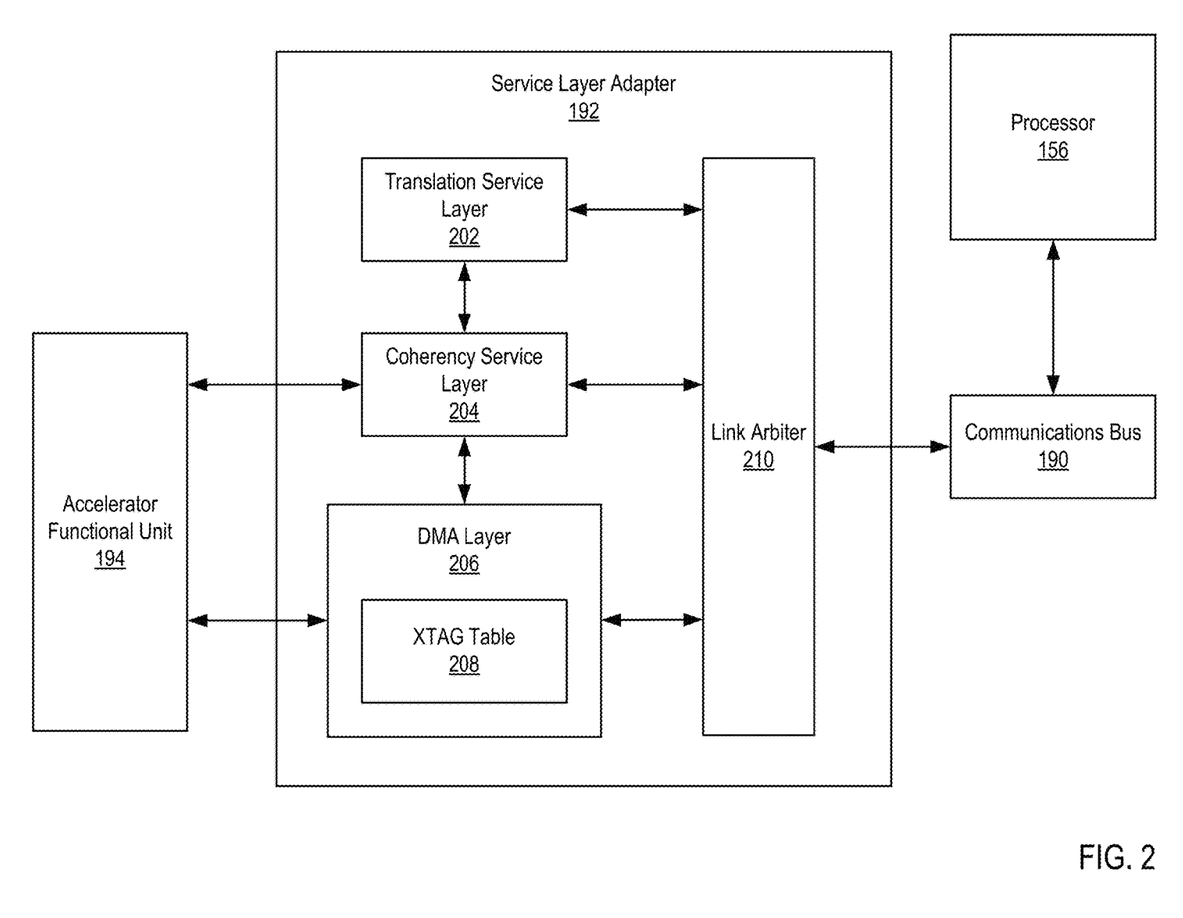
FIG. 2 sets forth a block diagram for direct memory access between an accelerator and a processor using a coherency adapter according to embodiments of the present invention.

FIG. 2 is an example block diagram of a system configured for direct memory access between an accelerator and a processor using a coherency adapter. FIG. 2 includes the accelerator functional unit (194), the service layer adapter (192), a communications bus (190), and a processor (156). The service layer adapter (192) includes a translation service layer (202), a coherency service layer (204), a DMA layer (206), and a link arbiter (210). The DMA layer (206) includes an XTAG table (208).

The accelerator functional unit (AFU) (194) is an accelerator configured to extend the functionality of the computing system. The AFU (194) may be a removable component of the computing system installed to perform a specific task or group of tasks. Example AFUs (194) include, for example, network interface cards, graphics accelerator cards, and storage adapter cards.

The communications bus (190) is a medium through which data is moved between hardware components on the computing system. The communications bus (190) may include a bus controller that manages data transmitted on the communications bus (190). Example communications buses (190) include peripheral component interconnect express (PCIe) buses.

The AFU (194) may be configured to send coherency-based operations and DMA instructions to other hardware elements on the computing system via the communications bus. The processor (156) may include a coherent accelerator processor proxy that provides, to the AFU (194), access to the coherent symmetric multiprocessing bus on the processor (156). The proxy may be used by a coherent accelerator proxy interface that allows the AFU (194) to participate in symmetric multiprocessing coherency protocols.

The service layer adapter (192) adapts the communications between the AFU (194) and the coherent accelerator proxy interface. Communication between the service layer adapter (192) and the proxy is encapsulated into packets over the communications bus to the processor. The service layer adapter (192) may be implemented on an external chip, such as a field programmable gate array or application specific integrated circuit.

The service layer adapter (192) may be configured to service coherency-based operations initiated by the AFU (194). The service layer adapter (192) includes a translation service layer (202), a coherency service layer (204), and a DMA layer (206). The translation service layer (202) may include elements and logic for retrieving a context for an operation and translating effective addresses to real addresses using an effective-to-real address translation (ERAT). The effective address is an address used by elements and processes in the computing system to refer to memory locations. However, the effective address must be translated into a real address in order to access the requested data. Effective addresses may be referred as virtual addresses, and real addresses may be referred to as physical addresses. The translation service layer (202) may also include a context cache to store frequently accessed contexts and an ERAT cache to store frequently accessed real address translations.

The coherency service layer (204) may include elements and logic to carry out coherency-based operations. The coherency service layer (204) receives context-based communications from the AFU (194) (via a coherency interface) and communicates with the other layers in the service layer adapter (192) to service the operations. The coherency service layer (204) may also include a data cache to store data frequently targeted by coherency-based operations. The coherency service layer (204) also handles other tasks related to maintaining data coherency between the AFU (194) and other memory locations on the computing system.

In addition to coherency-based operations, the service layer adapter (192) may also be configured to service DMA requests using either the coherency service layer (204) or the DMA layer (206). However, servicing DMA requests in the coherency service layer (204) via the coherency interface may require additional packet headers for use by the proxy, added latency in routing each packet through a bus controller, and additional data size limitations imposed by the bus controller.

The DMA layer (206) may be utilized for DMA requests without utilizing the functionality of the coherency service layer (204) for coherency-based operations. The DMA layer (206), via a DMA interface, provides a more direct DMA interface than that provided by the coherency service layer (204). Further, the service layer adapter (192) may provide the AFU (194) with translation services for DMA operations without the need for translation control entry based address translation that would require pinned pages.

The DMA layer (206) provides translation services using translation tags (XTAGs). XTAGs are provided to the AFU (194) and stored in the XTAG table (208) mapped to a real address. The XTAG table (208) maps XTAGs to internal addresses, such as real addresses, used by the processor (156). An XTAG is used by the AFU (194) to identify memory locations within DMA instructions. The AFU (194) may have no access to or knowledge of real addresses used by the processor (156) or other device on the computing system.

The link arbiter (210) provides a translation layer to facilitate communication between the service layer adapter (192) and other hardware elements on the computing system, such as the processors. The link arbiter (210) may also provide an interface to update different caches (e.g., context cache, ERAT cache) on the service layer adapter (192) in the event of a cache miss.

The coherency interface on the coherency service layer (204) may be a distinct communication interface from the DMA interface on the DMA layer (206). For example, the coherency interface and the DMA interface may be separate pins on the chip that the service layer adapter (192) is implemented upon. Further, the service layer adapter (192) may include multiple ports exposed to the AFU (194). The exposed ports may be used by the AFU (194) to distribute DMA instructions according to the AFU (194) requirements.

Figure 3:
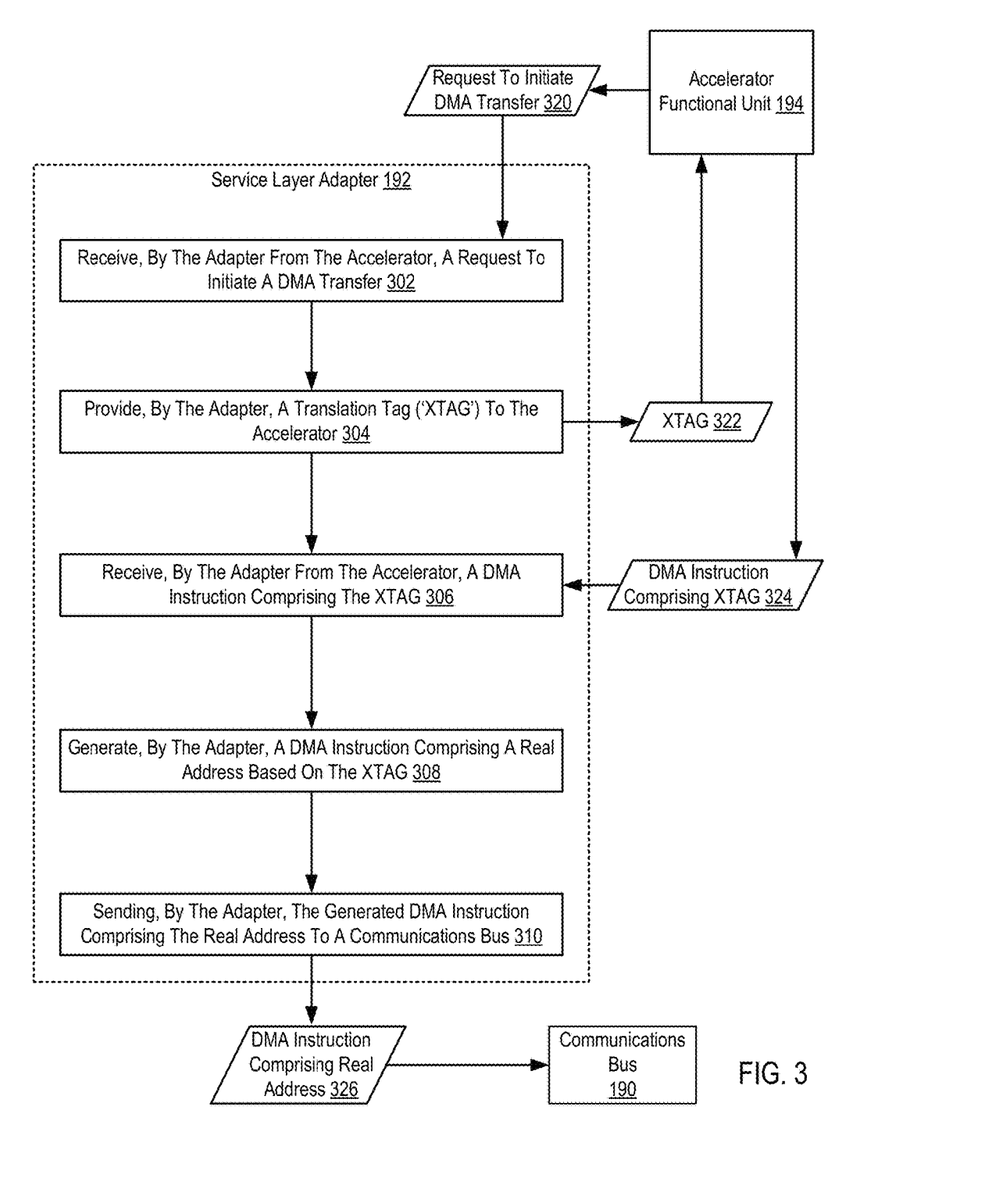
FIG. 3 sets forth a flow chart illustrating an exemplary method for direct memory access between an accelerator and a processor using a coherency adapter according to embodiments of the present invention.

For further explanation, FIG. 3 sets forth a flow chart illustrating an exemplary method for direct memory access between an accelerator and a processor using a coherency adapter according to embodiments of the present invention. The method of FIG. 3 includes receiving (302), by the adapter (192) from the accelerator (194), a request to initiate a DMA transfer (320). Receiving (302), by the adapter (192) from the accelerator (194), a request to initiate a DMA transfer (320) may be carried out by the accelerator (194) transmitting the request to initiate a DMA transfer (320) to a coherency interface on the coherency service layer of the adapter (192).

The request to initiate a DMA transfer (320) may include a location identifier, a process handle, and the operation identifier. The location identifier is an address that the accelerator uses to refer to a memory location on the processor, RAM, or other hardware element on the computing system. The location identifier may be, for example, an effective address. The process handle is an identifier of the context for the request. The context is used by the adapter (192) to translate the location identifier into a real address understood by the target device. The operation identifier identifies the type of operation the AFU (194) is initiating. The operation identifier may identify a coherency-based operation or DMA operation.

The method of FIG. 3 also includes providing (304), by the adapter (192), a translation tag ('XTAG') (322) to the accelerator (194). Providing (304), by the adapter (192), an XTAG (322) to the accelerator (194) may be carried out by determining, by the adapter (192), the real address for the DMA transfer using the request (320); and storing the read address in an XTAG table on the adapter (192), wherein the XTAG table maps the real address to the XTAG.

The method of FIG. 3 also includes receiving (306), by the adapter (192) from the accelerator (194), a DMA instruction comprising the XTAG (324). Receiving (306), by the adapter (192) from the accelerator (194), a DMA instruction comprising the XTAG (324) may be carried out by the accelerator (194) transmitting the DMA instruction comprising the XTAG (324) to a DMA interface on the DMA layer of the adapter (192). The DMA instruction comprising the XTAG (324) may be a DMA instruction instrumented for transmission on the communications bus (190) to other devices on the computing system but for the inclusion of the XTAG (322) in place of a real address.

Receiving (306), by the adapter (192) from the accelerator (194), a DMA instruction comprising the XTAG (324) may be carried out by receiving a DMA packet configured for transmission on the communications bus (190), but for the inclusion of the XTAG (322). For example, the DMA instruction comprising the XTAG (324) may be a PCIe DMA packet that includes an XTAG instead of a real address.

The method of FIG. 3 also includes generating (308), by the adapter (192), a DMA instruction comprising a real address (326) based on the XTAG. Generating (308), by the adapter (192), a DMA instruction comprising a real address (326) based on the XTAG may be carried out by obtaining (406), from the XTAG table, the real address mapped to the XTAG; and replacing (408), by the adapter, the XTAG in the DMA instruction with the real address.

Generating (308), by the adapter (192), a DMA instruction comprising a real address (326) based on the XTAG may also be carried out by deriving the real address from the XTAG algorithmically. For example, the adapter (192) may apply an algorithm to the real address to obtain the XTAG, and once the adapter (192) receives the XTAG, the adapter may apply a reverse algorithm to obtain the real address.

The method of FIG. 3 also includes sending (310), by the adapter (192), the generated DMA instruction comprising the real address (326) to a communications bus (190). Sending (310), by the adapter (192), the generated DMA instruction comprising the real address (326) to a communications bus (190) may be carried out using the link arbiter and a bus controller. The link arbiter may direct the DMA instruction comprising the real address (326) to the communications bus (190), and transmission on the communications bus (190) is directed by the bus controller.

Figure 4:
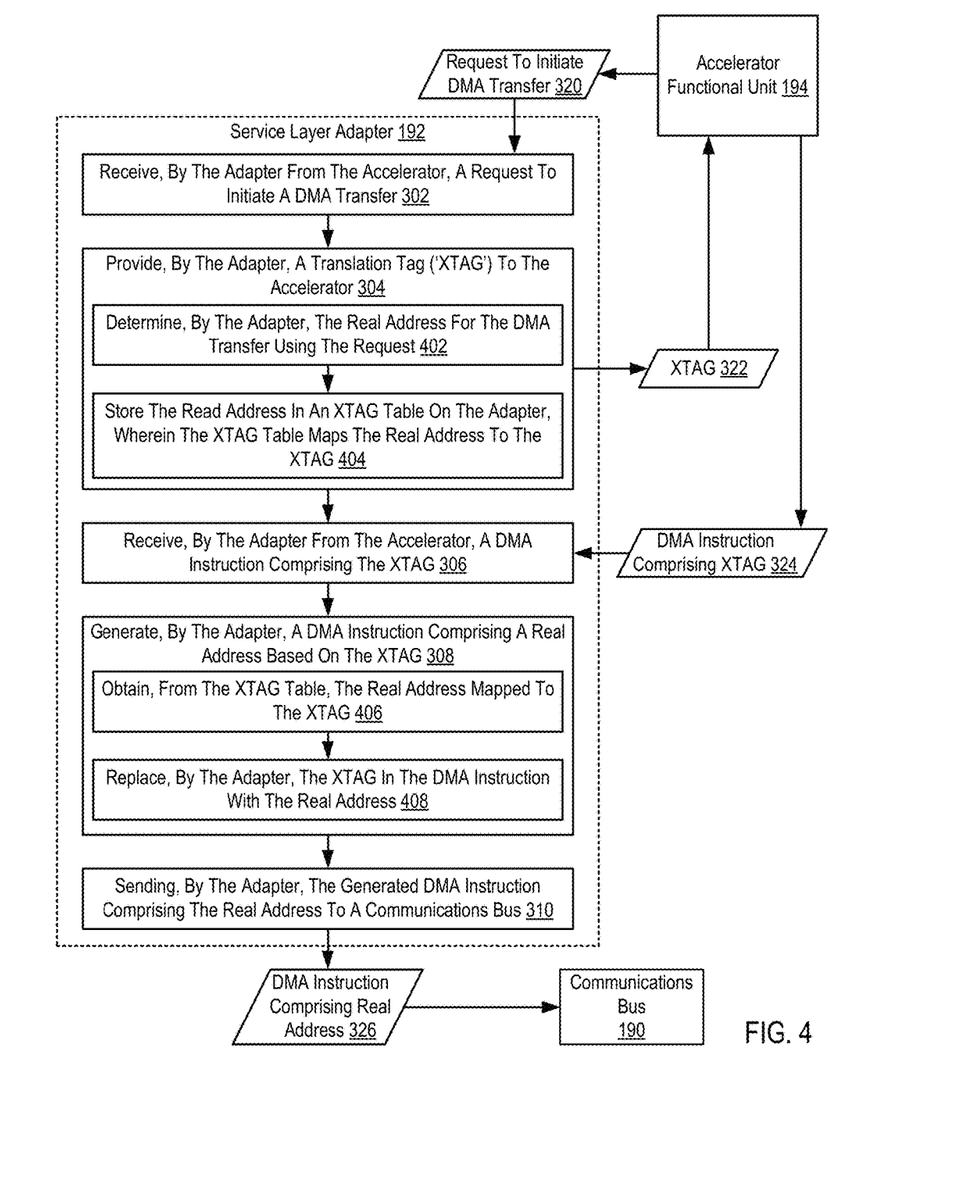
FIG. 4 sets forth a flow chart illustrating an exemplary method for direct memory access between an accelerator and a processor using a coherency adapter according to embodiments of the present invention.

For further explanation, FIG. 4 sets forth a flow chart illustrating an exemplary method for direct memory access between an accelerator and a processor using a coherency adapter according to embodiments of the present invention that includes receiving (302), by the adapter (192) from the accelerator (194), a request to initiate a DMA transfer (320); providing (304), by the adapter (192), a translation tag ('XTAG') (322) to the accelerator (194); receiving (306), by the adapter (192) from the accelerator (194), a DMA instruction comprising the XTAG (324); generating (308), by the adapter (192), a DMA instruction comprising a real address (326) based on the XTAG; and sending (310), by the adapter (192), the generated DMA instruction comprising the real address (326) to a communications bus (190).

The method of FIG. 4 differs from the method of FIG. 3, however, in that providing (304), by the adapter (192), a translation tag ('XTAG') (322) to the accelerator (194) includes determining (402), by the adapter (192), the real address for the DMA transfer using the request (320); and storing (404) the read address in an XTAG table on the adapter (192), wherein the XTAG table maps the real address to the XTAG.

Determining (402), by the adapter (192), the real address for the DMA transfer using the request (320) may be carried out by obtaining a context for the operation and using the context to translate the location identifier (e.g., an effective address) to a real address. The process handle may be used by elements within the adapter (e.g., the translation service layer (202)) to obtain a context from the processor (156) (or from a context cache within the adapter). The context is then used in conjunction with the location identifier to determine the real address. Determining (402), by the adapter (192), the real address for the DMA transfer using the request (320) may also be carried out by submitting the process handle and location identifier directly to the processor to obtain the real address.

Storing (404) the read address in an XTAG table on the adapter (192), wherein the XTAG table maps the real address to the XTAG may be carried out by generating the XTAG (322) and creating an entry in the XTAG table that maps the real address to the XTAG (322). The XTAG may be generated by applying a hash function to the read address. Alternatively, the XTAG may be generated using a consecutively issued addressing system. For example, each new XTAG may be generated based on the value of the previously issued XTAG (e.g., XTAG 002 is issued after XTAG 001, etc).

The method of FIG. 4 also differs from the method of FIG. 3, however, in that generating (308), by the adapter (192), a DMA instruction comprising a real address (326) based on the XTAG includes obtaining (406), from the XTAG table, the real address mapped to the XTAG; and replacing (408), by the adapter, the XTAG in the DMA instruction with the real address.

Obtaining (406), from the XTAG table, the real address mapped to the XTAG may be carried out by accessing the XTAG table and searching for an entry in the XTAG table keyed to the XTAG in the DMA instruction. Once a matching entry is found, the real address mapped to the XTAG is read out of the entry.

Replacing (408), by the adapter, the XTAG in the DMA instruction with the real address may be carried out by removing the XTAG value from the DMA instruction comprising the XTAG (324) and inserting the real address obtained from the XTAG table. For example, the DMA instruction "transfer data to XTAG A" may be received by the adapter (192). The adapter does a table lookup on the XTAG table using "XTAG A" and obtains the real address "0×0034". The adapter (192) then replaces "XTAG A" in the DMA instruction, resulting in the instruction "transfer data to 0×0034". The new DMA instruction is then forwarded to the communications bus (190).

Figure 5:
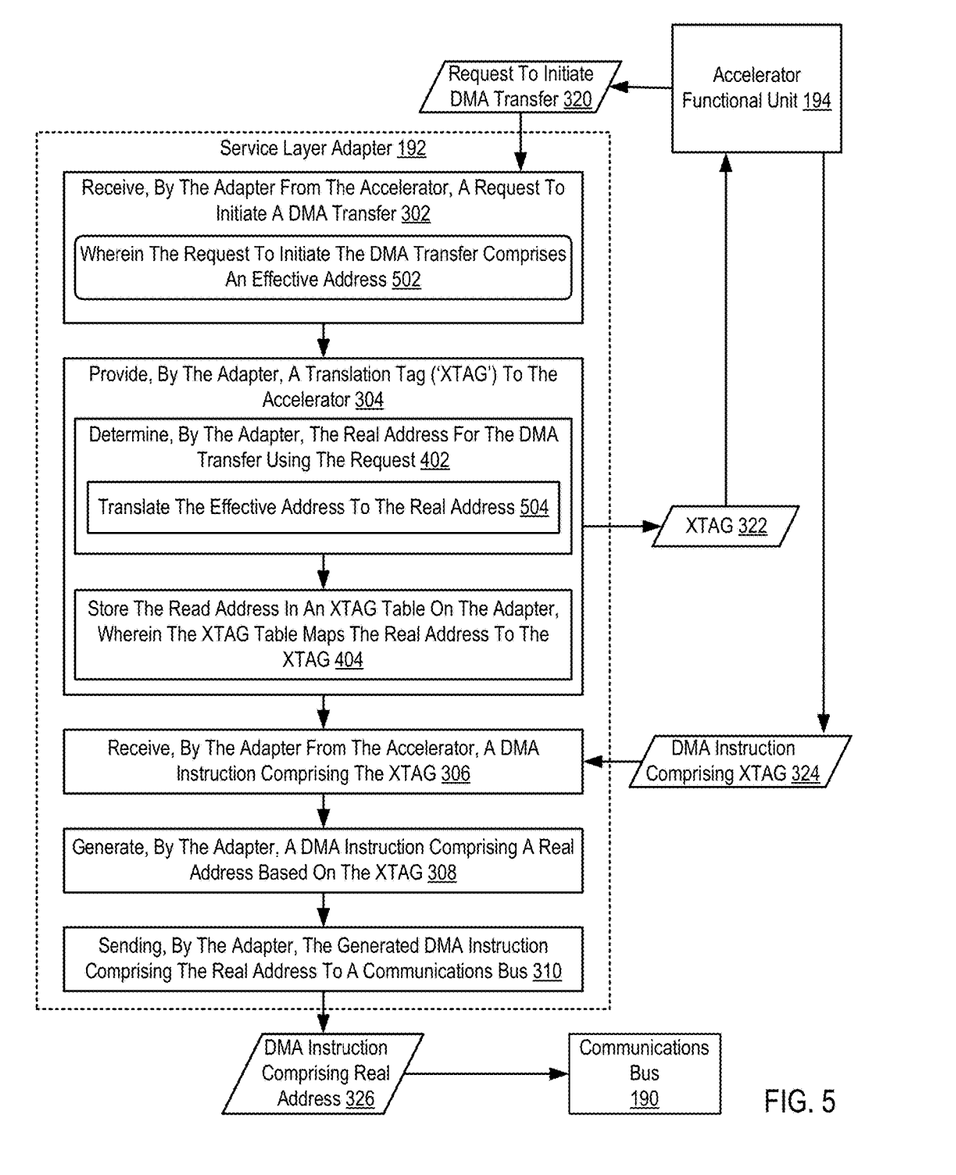
FIG. 5 sets forth a flow chart illustrating an exemplary method for direct memory access between an accelerator and a processor using a coherency adapter according to embodiments of the present invention.

For further explanation, FIG. 5 sets forth a flow chart illustrating an exemplary method for direct memory access between an accelerator and a processor using a coherency adapter according to embodiments of the present invention that includes receiving (302), by the adapter (192) from the accelerator (194), a request to initiate a DMA transfer (320); providing (304), by the adapter (192), a translation tag ('XTAG') (322) to the accelerator (194); receiving (306), by the adapter (192) from the accelerator (194), a DMA instruction comprising the XTAG (324); generating (308), by the adapter (192), a DMA instruction comprising a real address (326) based on the XTAG; and sending (310), by the adapter (192), the generated DMA instruction comprising the real address (326) to a communications bus (190).

The method of FIG. 5 differs from the method of FIG. 3, however, in that receiving (302), by the adapter (192) from the accelerator (194), a request to initiate a DMA transfer (320) includes wherein (502) the request to initiate the DMA transfer (320) comprises an effective address. The request to initiate the DMA transfer (320) includes a location identifier that may be in the form of an effective address. An effective address is an address of a location in memory used within the context of a process or group of processes. The location in memory may be within the cache on the processor or within the RAM. A real address is an absolute address that identifies a location within the processor cache or other memory on the computing system. The real address is recognized by the processor or other computing system entity that operates memory.

The method of FIG. 5 also differs from the method of FIG. 3, however, in that providing (304), by the adapter (192), a translation tag ('XTAG') (322) to the accelerator (194) includes determining (402), by the adapter (192), the real address for the DMA transfer using the request (320); and storing (404) the read address in an XTAG table on the adapter (192), wherein the XTAG table maps the real address to the XTAG.

The method of FIG. 5 differs from the method of FIG. 4, however, in that determining (402), by the adapter (192), the real address for the DMA transfer using the request (320) includes translating (504) the effective address to the real address. Translating (504) the effective address to the real address may be carried out using an ERAT cache.

The ERAT cache stores recently accessed effective address to real address translations. The adapter (192) may search the ERAT cache for a translation of the received effective address. If a translation for the effective address is stored in the ERAT cache, the real address is retrieved from the ERAT cache. If a cache miss occurs (e.g., the translation for the effective address is not in the ERAT cache), then the adapter (192) requests the translation from another entity on the computing system, such as the memory management unit. Once the translation is received from the entity, the translation is stored in the ERAT cache for future use.

Figure 6:
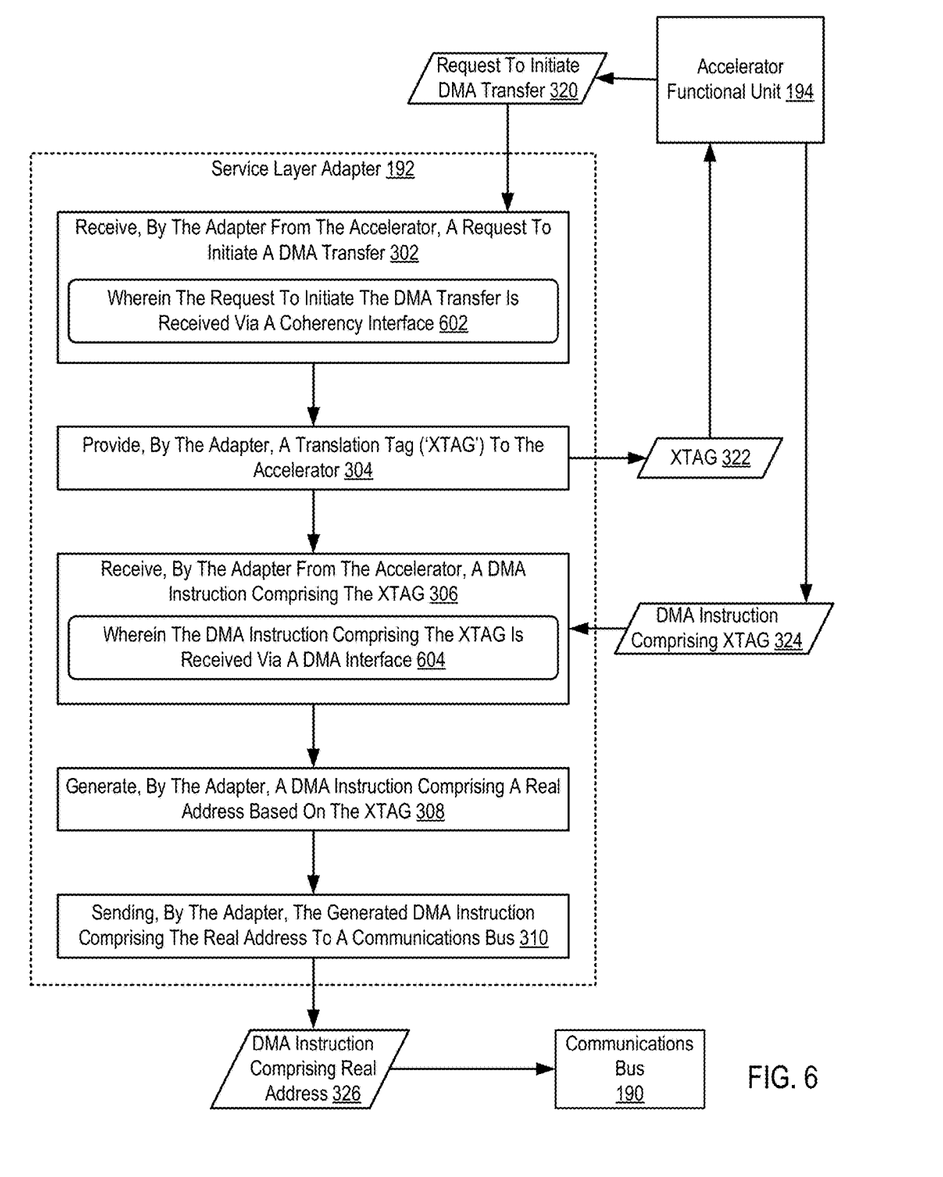
FIG. 6 sets forth a flow chart illustrating an exemplary method for direct memory access between an accelerator and a processor using a coherency adapter according to embodiments of the present invention.

For further explanation, FIG. 6 sets forth a flow chart illustrating an exemplary method for direct memory access between an accelerator and a processor using a coherency adapter according to embodiments of the present invention that includes receiving (302), by the adapter (192) from the accelerator (194), a request to initiate a DMA transfer (320); providing (304), by the adapter (192), a translation tag ('XTAG') (322) to the accelerator (194); receiving (306), by the adapter (192) from the accelerator (194), a DMA instruction comprising the XTAG (324); generating (308), by the adapter (192), a DMA instruction comprising a real address (326) based on the XTAG; and sending (310), by the adapter (192), the generated DMA instruction comprising the real address (326) to a communications bus (190).

The method of FIG. 6 differs from the method of FIG. 3, however, in that receiving (302), by the adapter (192) from the accelerator (194), a request to initiate a DMA transfer (320) includes wherein (602) the request to initiate the DMA transfer (320) is received via a coherency interface. For example, the request to initiate the DMA transfer (320) may be received on a pin of the adapter designated as the coherency interface. The request to initiate the DMA transfer (320) may alternatively or additionally be addressed to the coherency interface on the coherency service layer.

The method of FIG. 6 also differs from the method of FIG. 3, however, in that receiving (306), by the adapter (192) from the accelerator (194), a DMA instruction comprising the XTAG (324) includes wherein (604) the DMA instruction comprising the XTAG (324) is received via a DMA interface. For example, the DMA instruction comprising the XTAG (324) may be received on a pin of the adapter designated as the DMA interface. The DMA instruction comprising the XTAG (324) may alternatively or additionally be addressed to the DMA interface on the DMA layer.

In view of the explanations set forth above, readers will recognize that the benefits of Direct memory access between an accelerator and a processor using a coherency adapter according to embodiments of the present invention include:

Improving the operation of a computer system by providing an open processor DMA interface to an AFU independent of the coherent interface, increasing storage access efficiency.

Improving the operation of a computer system by negating the need for DMA packets to be encapsulated as proxy packets, thereby eliminating the proxy header overhead, increasing bandwidth efficiency.

Improving the operation of a computer system by adapting the AFU DMA to be serviced directly by a bus controller on a processor instead of having to be redirected to a proxy unit, reducing latency.

Improving the operation of a computer system by enabling the DMA to support the maximum transmission unit size the bus controller can support without being limited by the size of the cacheline, increasing transmission efficiency.

Improving the operation of a computer system by enabling AFU initiated DMA with effective addresses with true core memory management-like address translation, avoiding the I/O based translation control entry address translations and eliminating the need for pinned pages, increasing transmission efficiency.

Improving the operation of a computer system by implementing a "slice" approach in the adapter, providing the AFU implementation with an option to utilize either the coherent "slice", the DMA "slice", or both, increasing system efficiency.

Exemplary embodiments of the present invention are described largely in the context of a fully functional computer system for direct memory access between an accelerator and a processor using a coherency adapter. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of direct memory access ('DMA') between a processor and an accelerator, the processor coupled to the accelerator by an adapter the method comprising:
    providing, by the adapter, a translation tag ('XTAG') to the accelerator; and
    responsive to receiving a DMA instruction for a DMA transfer, wherein the DMA instruction comprises the XTAG generating, by the adapter, a DMA instruction comprising a real address based on the XTAG.

2. The method of claim 1, wherein providing, by the adapter, the XTAG to the accelerator comprises:
    determining, by the adapter, the real address for the DMA transfer using a request to initiate the DMA transfer; and
    storing the real address in an XTAG table on the adapter, wherein the XTAG table maps the real address to the XTAG.

3. The method of claim 2, wherein generating, by the adapter, the DMA instruction comprising the real address based on the XTAG comprises:
    obtaining, from the XTAG table, the real address mapped to the XTAG; and
    replacing, by the adapter, the XTAG in the DMA instruction with the real address.

4. The method of claim 2, wherein the request to initiate the DMA transfer comprises an effective address, and wherein determining, by the adapter, the real address for the DMA transfer using the request comprises translating the effective address to the real address.

5. The method of claim 1, wherein a request to initiate the DMA transfer is received via a coherency interface, and wherein the DMA instruction comprising the XTAG is received via a DMA interface.

6. The method of claim 5, wherein the coherency interface is part of a coherency service layer on the adapter, and wherein the DMA interface is part of a DMA layer on the adapter.

7. The method of claim 1, wherein a communications bus operatively couples the adapter to the processor.

8. An adapter for direct memory access ('DMA') between a processor and an accelerator, the processor coupled to the accelerator by the adapter, the adapter configured to carry out the steps of:
    providing, by the adapter, a translation tag ('XTAG') to the accelerator; and
    responsive to receiving a DMA instruction for a DMA transfer, wherein the DMA instruction comprises the XTAG, generating, by the adapter, a DMA instruction comprising a real address based on the XTAG.

9. The adapter of claim 8, wherein providing the XTAG to the accelerator comprises:
    determining, by the adapter, the real address for the DMA transfer using a request to initiate the DMA transfer; and
    storing the real address in an XTAG table on the adapter, wherein the XTAG table maps the real address to the XTAG.

10. The adapter of claim 9, wherein generating the DMA instruction comprising the real address based on the XTAG comprises:
    obtaining, from the XTAG table, the real address mapped to the XTAG; and
    replacing the XTAG in the DMA instruction with the real address.

11. The adapter of claim 9, wherein the request to initiate the DMA transfer comprises an effective address, and wherein determining the real address for the DMA transfer using the request comprises translating the effective address to the real address.

12. The adapter of claim 8, wherein a request to initiate the DMA transfer is received via a coherency interface, and wherein the DMA instruction comprising the XTAG is received via a DMA interface.

13. The adapter of claim 12, wherein the coherency interface is part of a coherency service layer on the adapter, and wherein the DMA interface is part of a DMA layer on the adapter.

14. The adapter of claim 8, wherein communications bus operatively couples the adapter to the processor.

15. A computer program product for direct memory access ('DMA') between a processor and an accelerator, the processor coupled to the accelerator by an adapter, the computer program product disposed upon a non-transitory computer readable medium, the computer program product comprising computer program instructions that, when executed, cause the adapter to carry out the steps of:
    providing, by the adapter, a translation tag ('XTAG') to the accelerator; and responsive to receiving a DMA instruction for a DMA transfer, wherein the DMA instruction comprises the XTAG, generating, by the adapter, a DMA instruction comprising a real address based on the XTAG.

16. The computer program product of claim 15, wherein providing, by the adapter, the XTAG to the accelerator comprises:
    determining, by the adapter, the real address for the DMA transfer using a request to initiate the DMA transfer; and
    storing the real address in an XTAG table on the adapter, wherein the XTAG table maps the real address to the XTAG.

17. The computer program product of claim 16, wherein generating, by the adapter, the DMA instruction comprising the real address based on the XTAG comprises:
    obtaining, from the XTAG table, the real address mapped to the XTAG; and
    replacing, by the adapter, the XTAG in the DMA instruction with the real address.

18. The computer program product of claim 16, wherein the request to initiate the DMA transfer comprises an effective address, and wherein determining, by the adapter, the real address for the DMA transfer using the request comprises translating the effective address to the real address.

19. The computer program product of claim 15, wherein a request to initiate the DMA transfer is received via a coherency interface, and wherein the DMA instruction comprising the XTAG is received via a DMA interface.

20. The computer program product of claim 19, wherein the coherency interface is part of a coherency service layer on the adapter, and wherein the DMA interface is part of a DMA layer on the adapter.

* * * * *